United States Patent Office 3,637,885
Patented Jan. 25, 1972

3,637,885
SEPARATION OF ALUMINUM ALKYLS
FROM OLEFINS
Gifford G. McClaflin, Ponca City, Okla., assignor to
Continental Oil Company, Ponca City, Okla.
No Drawing. Filed Oct. 21, 1969, Ser. No. 868,214
Int. Cl. C07c 11/02
U.S. Cl. 260—677 A                                6 Claims

ABSTRACT OF THE DISCLOSURE

It is disclosed that particulate vulcanized natural or synthetic rubber is an effective means for removing metal alkyls from hydrocarbons and is particularly useful for separating aluminum triethyl from dodecene.

BACKGROUND OF THE INVENTION

This invention relates generally to separation of metal alkyls from hydrocarbon. In a more specific aspect, this application relates to separation of aluminum triethyl from dodecene.

It is known that olefins can be prepared by reacting low molecular weight olefins and particularly ethylene with low molecular weight metal alkyls or metal hydrides. The low molecular weight olefins add on to the low molecular weight metal compound to produce higher molecular weight metal alkyls wherein the alkyl substituents will have a statistical distribution. The product is generally referred to as growth product. It is also known that these metal alkyls can be decomposed thermally or by displacement with the low molecular weight olefins to produce olefins having a statistical distribution of molecular weights and at the same time to regenerate the low molecular weight metal alkyl. Commercially, aluminum triethyl is grown with ethylene and growth product is displaced with ethylene to regenerate aluminum triethyl and a mixture of alpha olefins. It is also known, that the aluminum triethyl and dodecene cannot be separated by simple distillation. The prior art has proposed several methods of making this separation. Bowden in U.S. Pat. No. 3,149,179 proposes the use of membrane for the separation. Ziegenhain in U.S. Pat. No. 3,344,202 proposes forming a complex of the aluminum triethyl with a complexing agent such as tetramethyl ammonium chloride. The membrane separation requires careful selection of pore size of the membrane and is relatively slow. The complex requires the breaking of the complex by pyrolysis under high vacuums and high temperatures.

At the present time, the only separation which presents a problem in commercial operations, so far as is known to me, is the separation of aluminum triethyl from dodecene; however, Ziegler et al. in U.S. Pat. No. 2,699,457 and others have shown that olefins can be prepared from growth product and displacement using other metals than aluminum, for example, gallium, indium, and beryllium.

SUMMARY OF THE INVENTION

According to this invention metal alkyls in hydrocarbon are contacted with particulate vulcanized rubber. The hydrocarbon is recovered essentially free of the metal alkyl.

DESCRIPTION OF THE PREFERRED EMBODIMENTS

As has been indicated, the most troublesome separation of metal alkyls and hydrocarbon at the present is the separation of aluminum triethyl (ATE) and dodecene. In practice, the other hydrocarbons will be separated by fractional distillation; however, the $C_{12}$ olefin and ATE will come over together. The invention is applicable to separating the ATE from the full range of olefins obtained from growth product; however, distillation is the preferred method of separation where it can be employed. As has been indicated above, the invention is applicable for separating metal alkyls from hydrocarbons generally and has particular advantage when the metal alkyl has a boiling point too close to the hydrocrbon to efficiently separate by distillation. Thus the preferred embodiment would include the step of making a first separation by fractional distillation and thereafter separating the metal alkyl from that fraction containing same.

Metal alkyl in this specification includes not only those metals fully substituted by alkyls but also those metals having at least one alkyl attached directly to the metal. Such metal alkyls then would include aluminum triethyl, diethyl aluminum hydride, ethyl aluminum dihydride, lithium aluminum tetraalkyls, sodium aluminum trialkyl hydrides, diethyl aluminum chloride, beryllium alkyl hydrides, beryllium dialkyls, similar compounds of gallium and indium and the like. The alkyls of the greatest commercial importance are ethyl; however, higher molecular weight alkyls can also be separated, e.g., aluminum tripropyl, diethyl aluminum butyl, dihexyl aluminum hydride, and the like as well as similar compounds of other metals. Again, the separation is of particular value when the particular metal alkyl and the particular hydrocarbon have close boiling points. Also, the method has the advantage where the boiling point is above the decomposition temperature of the metal alkyl to be recovered.

The mixture is contacted with a vulcanized rubber. This rubber is ground to particles of preferably not over ¼-inch in its longest dimension in order to provide a large surface area and also preferably the fines of less than about 100 mesh will be removed. A particularly useful range is 25 to 100 mesh. The rubber can be natural or synthetic such as polyisoprene, polybutadiene, butadiene styrene copolymer and the like. Such synthetic rubbers which are vulcanizable with sulfur are well known to the art.

The preferred contacting method is by packing a column with the particulate rubber and passing the hydrocarbon-metal alkyl composition through the column until the rubber no longer holds the metal alkyl. The metal alkyl is then receovered by eluting with a hydrocarbon which can be readily separated by distillation or which can be used as the solvent for the metal alkyl in the process wherein the alkyl originated, e.g., will be recycled.

The metal alkyl is removed from the rubber by eluting with metal free hydrocarbon. Aromatics, olefins, or paraffinic hydrocarbons are operable which are liquid under the conditions of contacting the rubber containing the metal alkyl; however, since normal paraffins are generally employed as solvent for ATE in the growth process, such materials are preferred. That is, normal paraffins of 5 to 10 carbon atoms will generally be used when a pure paraffin is used. In commercial operation one would use a mixed paraffin such as kerosene or white oil.

Examples

In the examples below, all of the dodecene-ATE mixture remained in the column and is eluted with n-heptane. These examples illustrate the elution step. In practice, the mixture would pass through the column with the ATE; and, part of the dodecene being held by the rubber, the ATE-dodecene would then be eluted to recover ATE. The first fractions would be contaminated by dodecene which could be recycled for further growth or to suppress the formation of the $C_{12}$ alkyl to the statistical distribution. The ATE free of dodecene would be recycled to the hydrogenation zone in a process wherein alpha olefins are being prepared by Ziegler chemistry. Suitable elution temperature will depend upon the particular hydrocarbon

Example 1

Charge to upright chromatographic column.—20 grams vulcanized polyisoprene rubber, containing 2.63 w./o. sulfur. Rubber was prepared by chopping it up in a Waring blender in n-heptane. This was followed by liquid-liquid extractions using n-hexane followed by carbon disulfide, followed by n-hexane. Rubber was then dried in a 80° C. vacuum oven and screened to yield particles of approximately 80–100 mesh free of powder. Rubber was further conditioned by heating it with a solution of aluminum triethyl to remove free sulfur and/or oxygen. Aluminum triethyl was eluded using 90° C. n-heptane.

4.01 grams (5 ml.) mixture containing 25 w./o. aluminum triethyl in dodecene. Mixtures analyzed 5.45 w./o. aluminum.

Procedure.—Column ingredients were protected from moisture and oxygen by keeping the system under nitrogen. Six (6) fractions were collected. Fractions were analyzed for percent aluminum and for presence of dodecene. The data are summarized in Table I.

TABLE I.—CHROMATOGRAPHIC EXTRACTION OF ALUMINUM TRIETHYL-DODECENE MIXTURE

| Fraction Number | Extraction Temp., ° C. | Weight obtained (g.) | Dodecene present | W./o. aluminum | Grams aluminum [1] |
|---|---|---|---|---|---|
| 1 | Ambient | 43.6 | Yes | 0.15 | 0.065 |
| 2 | Ambient | 33.8 | Trace | 0.021 | 0.007 |
| 3 | Ambient | 33.0 | None | 0.005 | 0.002 |
| 4 | 90 | 36.8 | do | 0.05 | 0.018 |
| 5 | 90 | 33.1 | do | 0.015 | 0.005 |
| 6 | 90 | 35.1 | do | 0.009 | 0.003 |
| Total | | | | | 0.100 |

[1] Actually obtained as aluminum triethyl.

NOTE.—Aluminum charged: 0.22 gram. Aluminum recovered: 0.10 gram=45 percent of charge. Aluminum recovered free of dodecene: 0.028 gram=12.7 percent of charge.

Example 2

Vulcanized rubber used in Example 1 was contacted again with 25 percent ATE in dodecene. Thus, 4.82 g. of the standard 25 w./o. ATE in dodecene solution was contacted with the vulcanized rubber and extracted as in Example 1. The results are shown in Table II.

TABLE II.—CHROMATOGRAPHIC EXTRACTION OF ALUMINUM TRIETHYL-DODECENE MIXTURE

| Fraction Number | Extraction Temp., ° C. | Weight obtained (g.) | Dodecene present | W./o. aluminum | Grams aluminum |
|---|---|---|---|---|---|
| 1 | Ambient | 43 | Yes | 0.26 | 0.110 |
| 2 | Ambient | 34 | None | 0.02 | 0.006 |
| 3 | Ambient | 32.8 | do | 0.01 | 0.003 |
| 4 | 90 | 35.7 | do | 0.06 | 0.021 |
| 5 | 90 | 33.7 | do | 0.02 | 0.007 |
| 6 | 90 | 33.3 | do | 0.01 | 0.003 |
| Total | | | | | 0.150 |

NOTE.—Aluminum charged: 0.26 gram. Aluminum recovered: 0.150 gram=58 percent of charge. Aluminum recovered free of dodecene: 0.04 gram=15.4 percent of charge.

Example 3

Example 1 was repeated using vulcanized rubber from Example 2. In this experiment 4.77 g. of the standard 25 percent ATE/dodecene mixture was used. Results are shown in Table III.

TABLE III

| Fraction Number | Extraction temp., ° C. | Weight obtained (g.) | Dodecene present | W./o. aluminum | Grams aluminum |
|---|---|---|---|---|---|
| 1 | Ambient | 44.9 | Yes | 0.29 | 0.130 |
| 2 | Ambient | 36.6 | None | 0.01 | 0.004 |
| 3 | Ambient | 31.8 | do | 0.01 | 0.003 |
| 4 | 90 | 39.8 | do | 0.048 | 0.019 |
| 5 | 90 | 29.1 | do | 0.02 | 0.006 |
| 6 | 90 | 34.9 | do | 0.03 | 0.010 |
| Total | | | | | 0.172 |

NOTE.—Aluminum charged: 0.26 gram. Aluminum recovered: 0.17 gram=65 percent of charge. Aluminum recovered free of dodecene: 0.042 g.=16 percent of charge.

Example 4

Example 1 was repeated using vulcanized rubber from Example 3. In this experiment 4.98 g. of the standard ATE in dodecene was used. The results are shown in Table IV.

TABLE IV

| Fraction Number | Extraction temp., ° C. | Weight obtained (g.) | Dodecene present | W./o. aluminum | Grams aluminum |
|---|---|---|---|---|---|
| 1 | Ambient | 35.5 | Yes | 0.43 | 0.150 |
| 2 | Ambient | 34.6 | None | 0.01 | 0.003 |
| 3 | Ambient | 33.1 | do | 0.01 | 0.003 |
| 4 | 90 | 37.2 | do | 0.03 | 0.011 |
| 5 | 90 | 33.8 | do | 0.01 | 0.003 |
| 6 | 90 | 36.4 | do | 0.01 | 0.003 |
| Total | | | | | 0.173 |

NOTE.—Aluminum charged: 0.27 gram. Aluminum recovered: 0.173 gram=64 percent of charge. Aluminum recovered free of dodecene: 0.023 gram=8.5 percent of charge.

Example 5

Example 1 was repeated using vulcanized rubber from Example 4, but a different ATE/dodecene ratio was used. In this experiment 3.7 g. of ATE/dodecene solution containing 0.47 w./o. aluminum was added to the vulcanized rubber. Results are shown in Table V.

TABLE V

| Fraction Number | Extraction temp., ° C. | Weight obtained (g.) | Dodecene present | W./o. aluminum | Grams aluminum |
|---|---|---|---|---|---|
| 1 | Ambient | 33.3 | Yes [1] | 0.01 | 0.003 |
| 2 | Ambient | 33.3 | Trace | 0.01 | 0.003 |
| 3 | Ambient | 31.9 | None | 0.01 | 0.003 |
| 4 | 90 | 38.8 | do | 0.01 | 0.003 |
| 5 | 90 | 30.2 | do | 0.02 | 0.006 |
| 6 | 90 | 34.8 | do | 0.01 | 0.003 |
| Total | | | | | 0.021 |

[1] Dodecene was recovered practically free of aluminum.

NOTE.—Aluminum charged: 0.017 gram. Aluminum recovered: 0.021 gram=100+ percent of charge. Aluminum recovered free of dodecene: 0.015 gram=88 percent of charge.

Having thus described the invention, I claim:

1. A method of separating metal alkyls from admixture with hydrocarbons selected from liquid paraffins and olefins which comprises contacting the mixture with particulate vulcanized rubber and removing by phase separation a liquid comprising at least a portion of the hydrocarbons.

2. The method of claim 1 wherein said hydrocarbons comprise a first hydrocarbon which has a boiling point of about that of said metal alkyl and wherein retained hydrocarbon and metal alkyl with the rubber are eluted by a second liquid hydrocarbon which has a boiling point substantially different from that of said metal alkyl.

3. The method of claim 2 wherein the metal alkyl is aluminum triethyl and the said first hydrocarbon is dodecene.

4. The method of claim 3 wherein the said second hydrocarbon is a normal paraffin of 5 to 10 carbons.

5. The method of claim 4 wherein the elution step is carried out at a temperature in the range 70 to 100° C.

6. The method of claim 5 wherein the particulate rubber has its longest dimension in the range 100 mesh to ¼-inch.

References Cited

UNITED STATES PATENTS

| 3,149,179 | 9/1964 | Bowden | 260—677 |
| 3,344,202 | 9/1967 | Ziegenhain | 260—683.15 |
| 2,699,457 | 1/1955 | Ziegler | 260—683.15 |

DELBERT E. GANTZ, Primary Examiner

J. M. NELSON, Assistant Examiner

U.S. Cl. X.R.

260—683.15 D